United States Patent

Steck

[15] 3,645,635
[45] Feb. 29, 1972

[54] SIGHTING DEVICE
[72] Inventor: William F. Steck, El Paso, Tex.
[73] Assignee: W. R. Weaver Company
[22] Filed: May 5, 1970
[21] Appl. No.: 34,665

[52] U.S. Cl. ........................................................356/252
[51] Int. Cl. ....................................................G02b 23/10
[58] Field of Search ..................356/251, 249, 252; 350/96 R

[56] References Cited

UNITED STATES PATENTS

| 683,203 | 9/1901 | Grubb | 356/251 |
| 3,456,211 | 7/1969 | Koester | 350;331/96 R;94.5 |
| 2,780,130 | 2/1957 | Mauer | 356/251 |
| 3,121,163 | 2/1964 | Rickert | 356/247 |
| 3,524,710 | 8/1970 | Rickert | 356/251 |

Primary Examiner—Ronald L. Wibert
Assistant Examiner—Conrad Clark
Attorney—Donald R. Motsko, H. Samuel Kieser and William W. Jones

[57] ABSTRACT

A sighting device for use, for example, with a shotgun, the device employing a reticle of fluorescent acrylic polymer disposed out of the field of view. The image of the reticle is projected into the field of view by a preferably dichroic partial reflector. Windage and elevation adjustments are included for moving the reticle to zero in the device on the target in the field of view.

4 Claims, 9 Drawing Figures

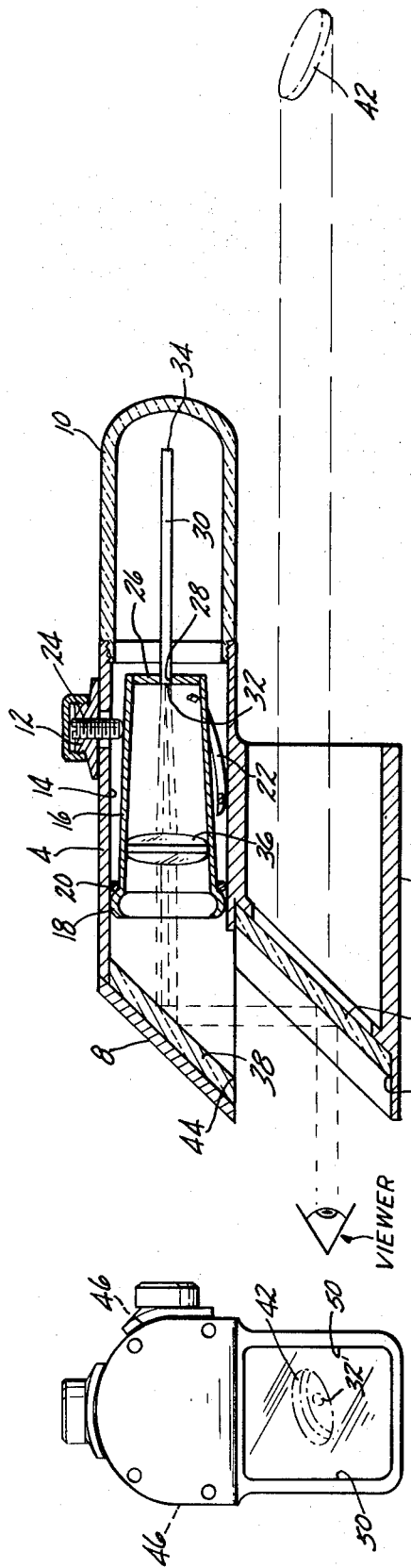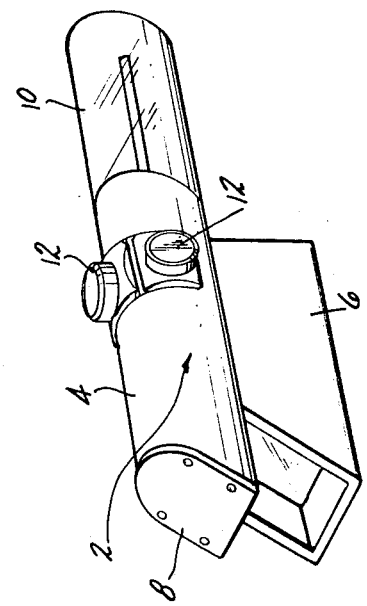

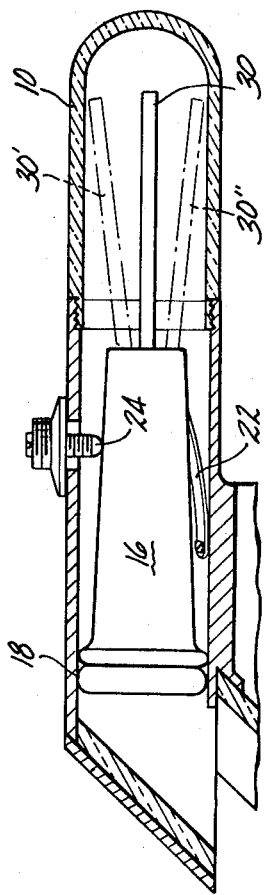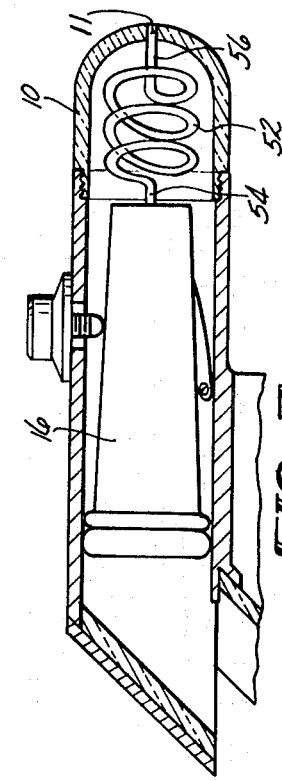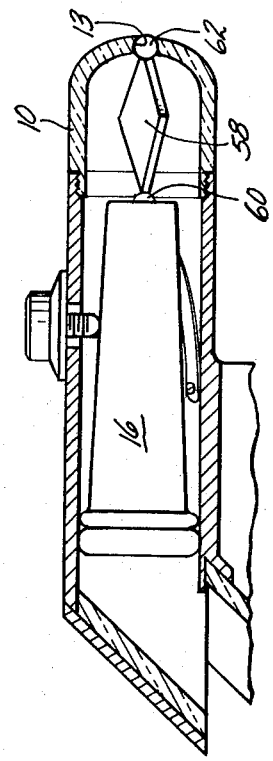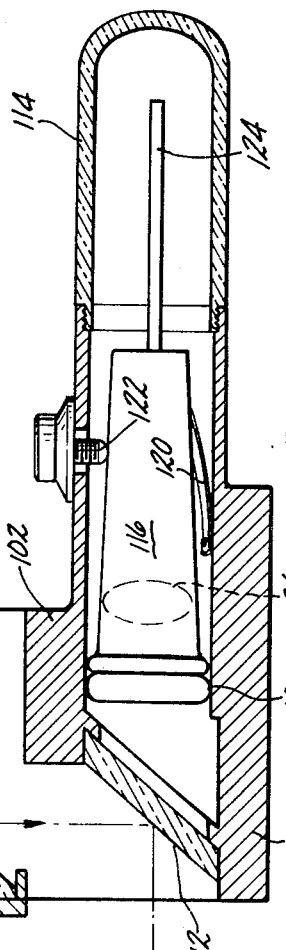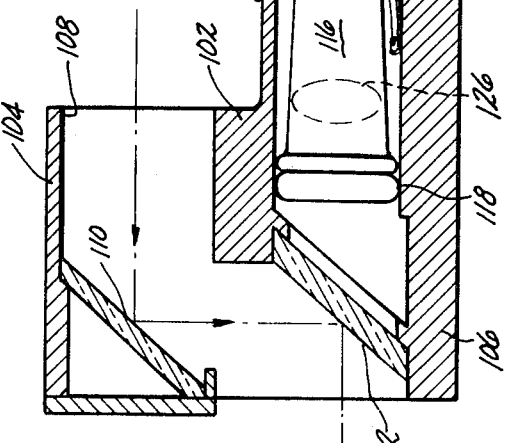

SIGHTING DEVICE

This invention broadly concerns a sighting device particularly adapted for use with firearms, such as shotguns, or the like.

The use of collimating sighting devices having a reticle which is projected into a field of view by reflecting means is broadly known, and one such sight is disclosed in U.S. Pat. No. 2,633,051 to Clinton S. Davis. Another such device is disclosed in U.S. Pat. No. 2,472,809 to John R. Decker. A problem which manifests itself in sighting devices of this type concerns the brightness of the image of the reticle which is superimposed onto the field of view. In order that the sight have maximum utility under all ambient daylight brightness from dawn to dusk, the image of the reticle must be as brilliant as possible. U.S. Pat. No. 2,472,809 seeks to solve the problem of the brightness of the reticle by providing an internal illuminator for use with the reticle and by providing means for varying the intensity of the illuminator. This solution is expensive and therefore undesirable for use in low to moderately priced sighting devices. This solution also requires the use of two reticles, one for use in bright ambient light, and another for use in dim ambient light.

It is further noted that a number of the prior art collimating-type sights require the operator to use both eyes, one eye views the target and the other eye views the reticle, with the eyes combining to superimpose the two views onto each other so that the reticle appears, to the operator, to be on the target. This latter type of sight has proven very efficient for those who are able to coordinate their two eyes sufficiently to use it, however, it has been found that the great majority of shooters are unable to achieve such coordination and thus cannot use the sight.

The sighting device of this invention solves the problem concerning the brightness of the reticle by using a reticle constructed of a fluorescent material, such as a fluorescent colored acrylic polymer which is exposed to ambient light. The material from which the reticle is made is chosen for its light piping characteristics as well as its ability to receive light through its sidewalls and pipe the received light to its end walls. The size and shape of the reticle is chosen so that the reticle has a substantially greater sidewall area through which light is received, as compared to the end, or edge wall area through which light is projected. Thus the light is received throughout a relatively large sidewall area and piped out through a relatively small end wall area so that the end wall portion appears substantially brighter than the sidewall area. The reticle is preferably made of a fluorescent colored material which emits a light beam in a preselected narrow wave length band of the spectrum, the most preferred material being one which emits an orange light, which is easiest for the eye to see.

The reticle is preferably mounted so that its sidewall portion and one of its end walls are fully exposed to ambient light which is thus received into the reticle body. The other end wall portion extends into a darkened chamber and thus appears as a bright spot within the darkened chamber. A mirror is positioned in the device so as to reflect the light from the reticle through approximately a 90° angle toward a partially reflective mirror which is preferably coated with a dichroic reflective coating chosen to reflect only the particular wavelength of light emerging from the reticle. The dichoric coating permits substantially all other wavelengths of light to pass through the partially reflective mirror without being reflected. The dichoric reflector is positioned in a housing defining the field of view and reflects the image of the reticle toward the operator's eye. The light from the target is permitted to pass through the partial reflector substantially unobstructed, so that the operator sees the field of view including the target, with the image of the reticle superimposed thereover. A collimating lens is preferably interposed between the reticle and the first reflecting mirror in such a position so as to transmit the rays from the reticle along parallel paths to the mirror. This permits the operator to move his head when using the device without causing the reticle image to leave the target as seen in the field of view.

The darkened chamber is preferably in the form of a tube which is pivotally mounted in the sight housing. Windage and elevation turrets are mounted on the housing and are operative to pivot the tube against the bias of a spring so as to move the reticle image and thereby correct for windage and elevation errors in the projectile trajectory to zero in the sight on the target.

It is therefore an object of this invention to provide a sighting device having a reticle of fluorescent acrylic polymer material which is disposed outside of the field of view and the image of which is projected into the field of view.

It is a further object of this invention to provide a sight of the character described wherein a partial reflector is used to superimpose the image of the reticle over the field of view.

It is yet another object of this invention to provide a sighting device of the character described wherein the partial reflector includes a dichroic coating providing high reflectance of the wavelength of light from the reticle and low reflectance of all other wavelengths of light.

It is a still further object of this invention to provide a sighting device of the character described wherein the reticle is a body having a longitudinal dimension which is substantially greater than its thickness.

These and other objects and advantages of this invention will become more readily apparent from the following detailed description of several preferred embodiments when read in conjunction with the accompanying drawings in which:

FIG. 1 is a perspective view of a preferred embodiment of the sighting device of this invention;

FIG. 2 is a vertical sectional view of the device of FIG. 1 showing the manner in which the reticle image is superimposed onto the image of the target;

FIG. 3 is an end view of the device of FIG. 2 showing the target and reticle image as they appear to the viewer;

FIG. 4 is a vertical sectional view of a portion of the device of FIG. 2 showing how the windage and elevations adjustments are accomplished;

FIG. 5 is a perspective view of a helical configuration of a reticle body preferred for use with the device;

FIG. 6 is a perspective view of a planar configuration of a reticle body preferred for use with the device;

FIG. 7 is a vertical sectional view of a portion of the sighting device showing the reticle of FIG. 5 mounted therein;

FIG. 8 is a vertical sectional view of a portion of the sighting device showing the reticle of FIG. 6 mounted therein; and FIG. 9 is a vertical sectional view of another embodiment of a sighting device formed in accordance with this invention.

Referring now to FIG. 1, a preferred embodiment of the sighting device of this invention is shown. The device includes a housing indicated generally by the numeral 2, the housing 2 having an upper portion 4 and a lower portion 6 extending longitudinally of the housing and parallel to each other. Both ends of the lower portion 6 are open, and the rearward end of the upper portion 4 is preferably closed by means of an opaque plate 8. A tubular member 10 of transparent plastic, or glass, is attached to the forward end of the upper portion 4 to project forwardly therefrom, the forward end of the tube 10 preferably being closed. It is noted that the housing 2 can be modified in any known manner to permit mounting on a firearm or other instrument with which it is to be used. A pair of windage and elevation turrets 12 of conventional construction are mounted on the upper portion 4 of the housing, and the operation of the turrets will be set forth in greater detail hereinafter.

Referring to FIGS. 2 and 3, the upper portion 4 of the housing includes a bore 14 which is preferably circular in cross section and in which is mounted a tubular member 16. The rearward end of the tubular member 16 is preferably radially enlarged as at 18 to provide a pivoting mount connection for the tube 16. Thus the tube 16 can be pivoted about its rearward end within the bore 14. A rubber ring 20 may be mounted forward of the enlargement 18 in snug engagement with the wall of the bore 14 so that no light can pass rearwardly between the wall of the bore 14 and the enlargement 18. A blade spring member 22 is secured to the wall of the bore 14 and also to the tube 16 at a point forward of the enlargement 18 so as to bias the tube 16 for pivoting movement about the enlargement 18. An adjustment screw 24 is threaded through each of the turrets 12 with the inner end of each screw 24 bearing against the tube 16 at points approximately 90° apart. The spring member 22 is positioned so as to bias the tube 16 against both screws 24.

A sheet of opaque material 26 is positioned in the forward end of the tube 16 to prevent light from passing into the forward end of the tube 16. An aperture 28 is disposed in the center of the opaque sheet 26 and a reticle 30 is mounted in the aperture 28, the reticle 30 projecting forwardly from the opaque sheet 26 and into the confines of the transparent tube 10. The reticle 30 is preferably in the form of a solid cylindrical body of acrylic polymer. It is formed by extruding a powdered form of the polymer in a known manner. The polymer includes a dye additive which gives it color, preferably a bright color such as red or orange, and also includes an additive which gives it maximum fluorescence. A further additive is included to give the fluorescence imparted to the polymer maximum permanence. The reticle body includes a longitudinal dimension, a thickness dimension, and a width dimension. When the reticle takes the form of a cylinder as shown in FIG. 2, the thickness and width are equal. The longitudinal dimension must be substantially greater than the thickness so as to form a body with a relatively large sidewall area as compared to its end wall area. The large sidewall area is exposed to ambient light by being positioned within the transparent tube 10. The ambient light then passes through the large sidewall area and is piped through the reticle body and out through the end of the reticle disposed within the tube 16. Thus the inner end 32 of the reticle 30 appears as a very bright spot within the darkened interior of the tube 16. The fluorescence of the reticle material greatly increases the brightness of the end 32. It is noted that the forward end wall 34 of the reticle 30 can be painted with an opaque coating without lowering the brightness of the inner end wall 32. It has been determined that satisfactory reticle size can be obtained by using a reticle rod having about a 0.050 inch diameter and optimum brightness will be achieved when the rod is longer than about 2 inches, and need be no longer than about 3 inches.

A collimating lens 36 is mounted in the interior of the tube 16 and is operative to magnify and convert the light rays from the end wall 32 of the reticle into parallel rays which are then directed against a first side mirror 38 which is mounted on the plate 8. The reflector 38 is preferably a first side mirror to eliminate a double image of the reticle end wall 32 which would otherwise occur at the reflector. While a first side mirror is preferred, other reflecting means, such as prisms or the like could be used without departing from the spirit of the invention.

The light rays from the reticle end wall 32 are reflected by the reflector 38 downwardly onto a partial reflector 40 mounted in the lower portion 6 of the housing 2. The partial reflector 40 is also preferably a first side mirror with a dichroic reflecting coating. The dichroic coating material is selected so as to reflect light rays in the wavelength emitted by the reticle 30, while permitting other light rays to pass through. Thus if the reticle has an orange color, the dichroic coating will be orange-reflecting. The dichroic coatings will reflect up to about 95° of the reticle color while passing greater than 70° of all the remaining colors in the spectrum. Since the reflector 40 is a partial reflector, the viewer can see the target 42 (shown in phantom) through the reflector 40 and can at the same time see the image 32' of the end wall 32 of the reticle superimposed over the target 42, as seen in FIG. 3. Thus the operator can use the sighting device of this invention with only one eye open because the device itself superimposes the reticle image and the target one over the other. The collimating lens 36 eliminates parallax between the reticle image 32' and the viewed target 42 so that the operator can move his eye without causing relative movement to occur between the reticle image and target. The rearwardmost edge 44 of the reflector 38 and the side edges 46 thereof are preferably outwardly spaced from the rearwardmost edge 48 and side edges 50 of the partial reflector 40 so that no halo will appear to the viewer at the edges of the partial reflector 40. Of course, the reflecting surfaces of the reflectors 38 and 40 should preferably be parallel to ensure proper operation.

Referring now to FIG. 4, the mode of operation of the windage and elevation adjustment controls are shown. The spring 22 is circumferentially positioned with respect to the tube 16 so as to bias the latter about the enlargement 18 and against both of the adjustment screws 24 (only one shown). Thus movement of the screws 24 results in pivotal movement of the tube 16. The diameter of the interior of the transparent tube 10 is substantially larger than the diameter of the reticle 30 so that the reticle can move between the positions 30' and 30'' easily without contacting the transparent tube 10. It will be readily appreciated that movement of the tube 16 will result in a corresponding movement of the reticle image 32' as viewed on the partial reflector 40 with the extent of image movement being predetermined to correspond to a known displacement of the point of impact of the projectile or shot charge at a certain range.

Referring to FIGS. 5 and 6, alternative embodiments of the reticle used with the sighting device of this invention are shown. In FIG. 5, the reticle 52 takes the form of a cylindrical rod which is bend into a helical configuration. This configuration provides a large amount of sidewall area for absorption of light, while at the same time lessens the overall longitudinal distance between one of the reticle body and the other end thereof. This embodiment permits shortening of the transparent tube 10 (see FIG. 4) thus changing the external appearance of the device. One end 54 of the reticle 62 is straightened for insertion into the tube 16, and the other end 56 of the reticle 52 is straightened for inspection through an aperture 11 formed in the nose of the tube 10. Since the helical configuration is inherently springy, the windage and elevation adjustments can be easily made inspite of the fact that both ends of the reticle 52 are secured in place.

Another embodiment of the reticle contemplates the use of a planar body 58 having ball-shaped projections 60 and 62 at either end thereof. The planar configuration insures the provision of a large sidewall area for absorption of light to be piped to the rearward end wall. The planar reticle 58 also permits the length of the transparent tube to be shortened without lowering the light-absorbing ability of the reticle, since the sidewall area remains substantial (see FIG. 8). The rearward projection 60 is mounted in a spherical aperture (not shown) and the forward projection 62 is mounted in a spherical aperture 13 in the nose of the tube 10. Thus, ball and socket connections are formed at each end of the planar reticle 58 to permit the latter to pivot when the windage and elevation adjustments are made. It is noted that the thickness of the planar sheet 58 is relatively small when compared to the length and width so that the sidewall area (where light is absorbed) is large when compared to the end wall area (from whence light is projected). Thus the critical relationship between the sidewall (light absorbing) area, which is relatively large when compared to the end wall (light projecting) area, which is relatively small, is maintained so that the end wall area will appear to be substantially brighter than the sidewall area.

FIG. 9 discloses an alternative embodiment of the sighting device of this invention. This embodiment includes a housing 102 having an upper portion 103 and a lower portion 106 the upper portion 104 is open-ended at 108 to define a field of view. A first-surface mirror 110 is mounted in the upper portion 104 so as to reflect the field of view downwardly onto a first-surface partially reflective mirror 112. The mirrors 110 and 112 are so aligned that the field of view will be reflected back toward the viewers eye. A transparent tube 114 of plastic or glass is mounted on the front end of the lower portion 106 of the housing 102.

A tube 116 is mounted in the lower portion of the housing for pivotal movement about a radial enlargement 118 at its rearward end portion, there being a spring 120 engaging the sidewall of the tube 116 to bias the latter against windage and elevation adjustment screws 122 (only one of which is shown). A reticle member 124 in the form of a rod of acrylic polymer having appropriate color and fluorescence is mounted in the front end of the tube 116. In the same way as previously explained, the rearward end wall of the reticle 124 forms a bright spot inside the tube 116 which spot can be seen through the partial mirror 112. A collimating lens 126 is mounted in the tube 116 to collimate the light rays from the end wall of the reticle 124 to the eye of the viewer. Thus the image of the field of view is superimposed over the reticle. The operator can use the device with only one eye open since the device allows him to see both the target and reticle superimposed one over the other.

It is readily apparent that the sighting device of this invention can be used in all daylight conditions ranging from bright sunlight to heavy overcast and will provide a bright reticle which is easily discernable against the target. The brightness of the reticle is achieved without the necessity of providing an internal illuminating device to light the reticle, the reticle being illuminated exclusively by ambient external light; e.g., sunlight. The reticle body itself is formed from acrylic polymer having a dye and fluorescent material incorporated therein, and having a large sidewall area exposed to sunlight for absorbing the latter, and a small end wall area through which absorbed light is emitted. Since the end wall area is substantially smaller than the sidewall area, the end wall appears much brighter than the sidewall area to the eye of the viewer. Thus the reticle end wall, which forms the aiming point of the device, is always substantially brighter than the target area so as to clearly stand out therefrom.

Since many changes and variations of the disclosed embodiments of the invention may be made without departing from the inventive concept, it is not intended to limit the invention otherwise than as required by the appended claims.

What is claimed is:

1. A sighting device comprising:
   a. compound housing means including a first open-ended tubular portion providing a field of view for viewing a target, and a second tubular portion for containing an aiming point for said device;
   b. tubular means disposed in said second tubular portion of said housing means;
   c. mounting means securing said tubular means in said second tubular portion of said housing means for permitting vertical and horizontal lateral movement of one end of said tubular means within said second tubular portion of said housing means;
   d. means engaging said tubular means and actuable to impart controlled vertical and horizontal lateral movement to said one end of said tubular means;
   e. means darkening the interior of said tubular means, said darking means including opaque means restricting said one end of said tubular means and movable therewith, and said opaque means including an aperture therein;
   f. elongated colored fluorescent means having one end part thereof captured by said opaque means aperture, said fluorescent means including a sidewall portion of relatively large area exposed to ambient light, and said fluorescent means further including an end wall portion of relatively small area within said opaque means aperture, said fluorescent means being operative to absorb ambient incident light through said sidewall portion, convert said absorbed light to colored fluorescent light, and project said colored fluorescent light through said end wall portion of said fluorescent means into the darkened interior of said tubular means to form a brightly colored aiming point therein, said aiming point being vertically and horizontally laterally movable within said second portion of said housing means;
   g. compound reflecting means mounted in said housing means, said compound reflecting means including a first reflecting portion spanning said first portion of said housing means, and a second reflecting portion spanning said second portion of said housing means, said compound reflecting means being operative to form a superimposed image of said aiming point and said field of view; and
   h. collimating means mounted in said housing means between said end wall portion of said fluorescent means and said superimposed image to collimate the image of said aiming point.

2. The sighting device of claim 1, wherein said compound reflecting means includes a first side mirror spanning said second portion of said housing means, and a parallel first side partially reflective mirror with a dichroic reflecting surface spanning said first portion of said housing means.

3. The sighting device of claim 1, wherein said compound reflecting means includes a first side mirror spanning said first portion of said housing means and a parallel first side partially reflective mirror spanning said second portion of said housing means.

4. The sighting device of claim 1, further comprising hollow tubular transparent means mounted on said second portion of said housing means and surrounding said elongated colored fluorescent means to protect the latter against damage and permit ambient light to impinge upon said sidewall portion of said fluorescent means.

* * * * *

UNITED STATES PATENT OFFICE
CERTIFICATE OF CORRECTION

Patent No. 3,645,635     Dated February 29, 1972

Inventor(s) William F. Steck

It is certified that error appears in the above-identified patent and that said Letters Patent are hereby corrected as shown below:

In Column 4, line 31, please delete "bend" and insert --bead--;

In Column 4, line 39, please delete "inspection" and insert --insertion--;

In Column 4, line 69, please delete "103" and insert --104--.

Signed and sealed this 27th day of June 1972.

(SEAL)
Attest:

EDWARD M. FLETCHER, JR.
Attesting Officer

ROBERT GOTTSCHALK
Commissioner of Patents